United States Patent [19]

Bertalan et al.

[11] Patent Number: 5,245,363
[45] Date of Patent: Sep. 14, 1993

[54] PEN CLEANING SYSTEM FOR A PEN PLOTTER

[75] Inventors: John M. Bertalan, Tustin; Patrick Nguyen, Walnut; Brian C. Preston, Placentia, all of Calif.

[73] Assignee: CalComp Inc., Anaheim, Calif.

[21] Appl. No.: 675,285

[22] Filed: Mar. 26, 1991

[51] Int. Cl.$^5$ ............................................ G01D 15/16
[52] U.S. Cl. ................................................ 346/140 R
[58] Field of Search .............. 346/139 R, 140 R, 141, 346/46, 49, 29, 1.1; 400/18, 19, 20

[56] References Cited

U.S. PATENT DOCUMENTS

| | | | |
|---|---|---|---|
| 4,144,537 | 3/1979 | Kimura et al. ................. | 346/140 IJ |
| 4,173,020 | 10/1979 | Anderka et al. ................ | 346/140 R |
| 4,518,972 | 5/1985 | Gunderson et al. ............. | 346/139 R |

*Primary Examiner*—Mark J. Reinhart
*Attorney, Agent, or Firm*—Donald A. Streck; Wm. F. Porter, Jr.

[57] ABSTRACT

In a pen plotter having a pen carriage exchangeably carrying a pen with a downward-facing plotting tip controlled in its movement over a plotting area by control logic and also having a multiple pen-holding rotating turret hub controlled by the control logic, this invention consists of cleaning apparatus for automatically cleaning the tip of a pen after pickup from the turret hub and prior to or just after use. There is a brush ring having upward-facing bristles concentrically carried by the turret hub and additional logic contained in the control logic for moving the pen carriage to the brush ring to place the plotting tip within the bristles prior to or just after plotting with the plotting tip and for rotating the turret hub and the brush ring in combination when the plotting tip is within the bristles whereby to clean the plotting tip with the bristles. The brush ring can be rotated bi-directionally for better cleaning if desired. A debris tray can also be added under the brush ring for catching debris falling therefrom to prevent its entering the working parts of the plotter.

21 Claims, 1 Drawing Sheet

PEN CLEANING SYSTEM FOR A PEN PLOTTER

BACKGROUND OF THE INVENTION

The present invention relates to pen plotters and, more particularly, to a mechanism for cleaning the tips of pens employed therein during a pickup operation to or from a turret containing multiple pens.

In a pen plotter, an ink-containing pen is carried by a pen carriage over the surface of a plotting media. The pen has a plotting tip communicating with the ink which forms the plot-lines on the media when the tip is lowered by the pen carriage into contact with the media. Quite often, the plotter has a storage area outside of the plotting area where pens having different sized tips and/or colors are stored. During the plotting process, the pen carriage can go off-plot to the storage area and exchange pens as required for drawing lines of different widths and/or colors. All this, of course, is usually done automatically. Thus, once the pens are loaded by an operator into holding and exchanging apparatus in the storage area, the operator has no control over the condition of the pen tips.

Most plotting areas are not an environmentally clean environment like the so-called clean rooms where microelectronic parts are assembled. Thus, air-borne particles such as dust, lint, fuzz, hair, etc. can get onto the plotting media and from there to the pen tip to interfere with the accurate drawing of lines of the intended width. A small hair, for example, can trail behind the pen tip conducting a portion of the ink away from the tip and onto the surface of the plotting media creating a pattern of fine lines which ruin the plot for most purposes.

While most plotters having off-plot pen-holding devices include pen-capping members for "capping" the pen tips while in storage, such pen-capping members serve only to keep the pen tips from drying out due to evaporation in air and do nothing to clean the tips and remove any foreign matter therefrom.

Wherefore, it is the object of this invention to provide pen tip cleaning apparatus for a multi-pen plotter which automatically and thoroughly cleans the tips of the pens each time that they are picked up or replaced by the pen carriage for use.

Other objects and benefits of the invention will become apparent from the detailed description which follows hereinafter when taken in conjunction with the drawing figures which accompany it.

SUMMARY

The foregoing object has been achieved in a pen plotter having a pen carriage carrying a pen with a downward-facing plotting tip controlled in its movement over a plotting area by control logic, by the improvement of the present invention for automatically cleaning the tip prior to or just after use comprising, a brush member having upward-facing bristles located at a portion of the plotter outside of the plotting area reachable by the pen carriage; and, additional logic means contained in the control logic for moving the pen carriage to the brush member to place the plotting tip within the bristles prior to or just after plotting with the plotting tip.

In the preferred embodiment, there is also drive means for moving the brush member relative to the pen tip to have the bristles wipe the pen tip in a cleaning movement; and, logic means contained within the additional logic means and connected to the drive means for causing the drive means to move the brush member relative to the pen tip when the plotting tip is within the bristles.

Where the pen plotter includes a pen-holding and exchanging mechanism at a point outside of the plotting area, the brush member is located between the pen-holding and exchanging mechanism and the plotting area. In this version, there is also drive means driven by the pen-holding and exchanging mechanism for moving the brush member relative to the pen tip to have the bristles wipe the pen tip in a cleaning movement; and, logic means contained within the additional logic means and connected to the pen-holding and exchanging mechanism for causing the pen-holding and exchanging mechanism and thereby the drive means to move the brush member relative to the pen tip when the plotting tip is within the bristles.

Where the pen-holding and exchanging mechanism is a turret having a rotating center hub, the brush member is a brush ring concentrically carried by the center hub. Optionally in this version, there may be a ring-shaped debris tray disposed under the brush ring to catch debris falling from the brush ring. Also, the additional logic means also includes logic means for stopping the pen carriage with the pen tip engaged in the bristles of the brush ring; and, rotating the center hub and the brush ring in combination to clean the pen tip. For improved cleaning, the logic means for rotating the center hub and the brush ring in combination to clean the pen tip includes logic for first rotating the center hub and the brush ring in combination in a first direction and for then rotating the center hub and the brush ring in combination in a direction opposite the first direction.

The preferred bristles are of a plastic material which is stiff enough to thoroughly clean debris from the pen tip without damage thereto but which will not wick ink from the pen tip.

DESCRIPTION OF THE PREFERRED EMBODIMENT

Figure 2:
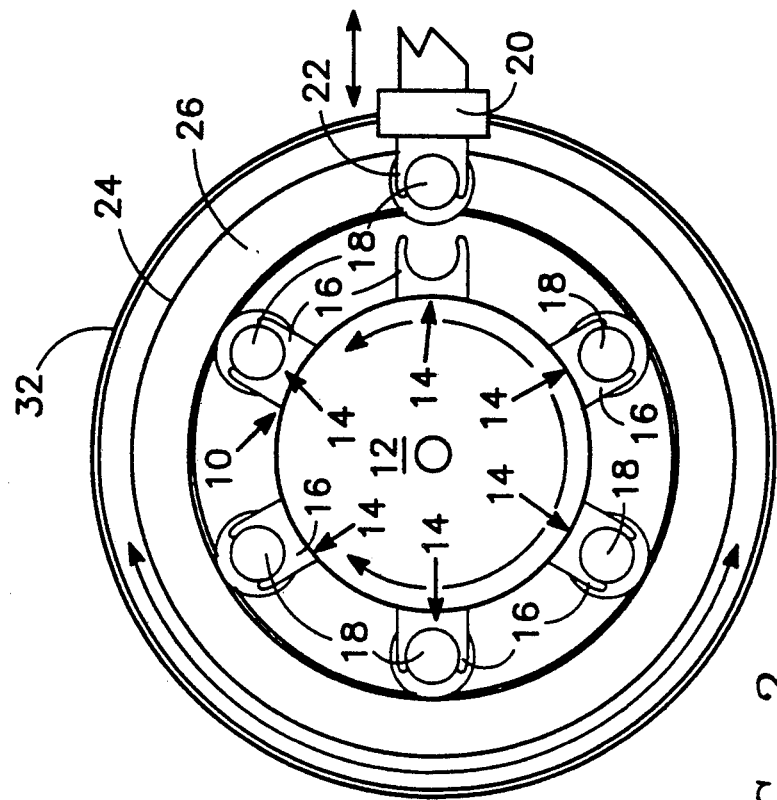
FIG. 2 is a top view of the apparatus of FIG. 1.
Figure 1:
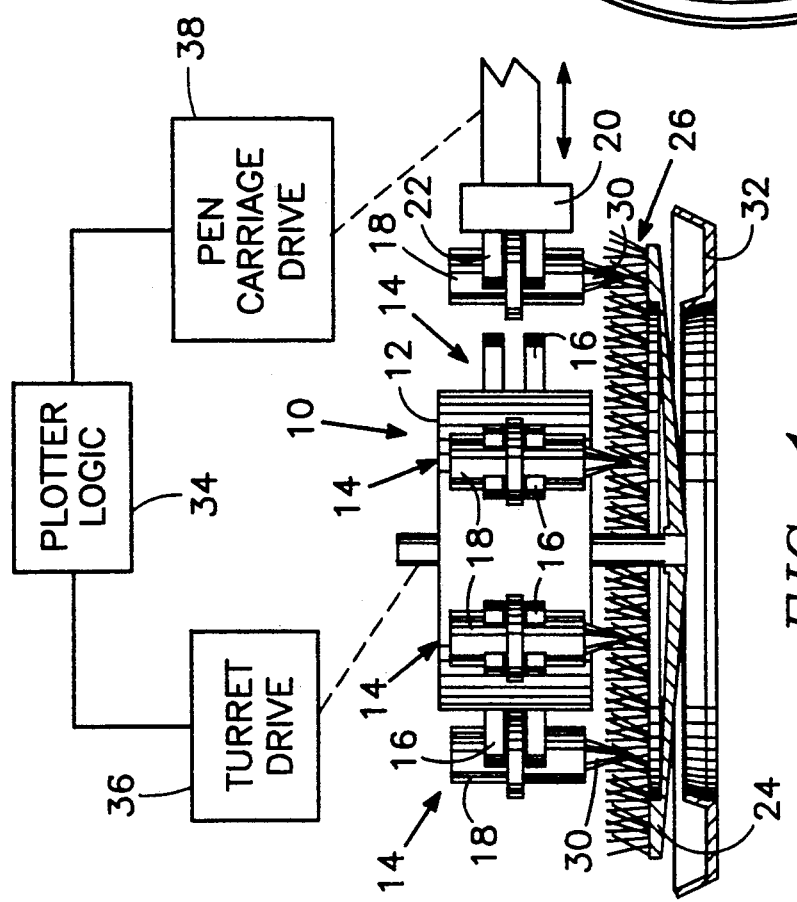
FIG. 1 is a simplified, partially cutaway side view of a pen plotter turret and pen carriage employing the present invention.

The preferred embodiment of the present invention will now be described with respect to implementation in combination with a so-called pen turret. As those skilled in the art will readily recognize and appreciate, the novel aspects thereof can be adapted to other types of pen-holding devices. Accordingly, the breadth accorded the claims appended hereto is intended to reflect the scope and spirit of the invention being described herein and not be limited by the use of a specific example.

The turret 10 contains a rotatable center hub 12 containing a plurality of pen-holding positions 14 about the periphery thereof. Each pen-holding position 14 comprises an exchange mechanism 16 which can hold a pen 18. The pen carriage 20 has a mating exchange mechanism 22. The two exchange mechanisms 16, 22 have the characteristic of switching a pen 18 held by one to the other when the two exchange mechanisms 16, 22 are brought together. Thus, to pick up a pen, the hub 12 is rotated to bring the selected pen 18 to an exchange position. The empty pen carriage 20 is moved to the exchange position and its exchange mechanism 22 is pressed into the exchange mechanism 16 of the hub 12 causing the selected pen 18 to move from being gripped by the exchange mechanism 16 of the hub 12 to being gripped by the exchange mechanism 22 of the pen carriage 20. The pen carriage 20 then moves back to the plotting area and uses the pen 18. The pen 18 is replaced in its waiting and empty position 14 on the hub 12 by simply repeating the above-described process which causes the selected pen 18 to move from being gripped by the exchange mechanism 22 of the pen carriage 20 to being gripped by the empty exchange mechanism 16 of the hub 12 at the pen's empty position 14.

To accomplish the objective of the present invention, a brush ring 24 is concentrically attached to the turret hub 12 to move in combination therewith. The brush ring 24 has a diameter greater than that of the pen-holding positions 14 and their exchange mechanisms 16. The brush ring 24 has upward-facing bristles 26 on a bottom surface thereof. The bristles 26 are preferably of a fairly stiff plastic material so as to be able to wipe debris from the pen tips 30 while not absorbing and wicking ink from the tips 30. Nylon and polyethylene are two possible materials for the bristles 26. Preferably, a ring-shaped debris tray 32 is removably mounted to a stationary portion of the plotter under the brush ring 24 so as to catch any debris which may fall out of the brush ring 24 and keep it out of the working parts of the plotter.

While some cleaning action can be obtained by a fixed brush with upwardly-facing bristles by simply wiping the pen tip 30 through the bristles as the pen 18 is moved from the pen-holding area from where it was just picked up back to the plotting area or the reverse, in the preferred embodiment as being described herein, the logic 34 controlling the movement of the hub 12 (via the turret drive 36) and the pen carriage 20 (via the pen carriage drive 38) is modified to rotate the hub 12 (and thereby the brush ring 24 carried thereby) after the pen 18 has cleared the exchange mechanism 16 from which it was just picked up, or before it reaches it, until such time as the pen carriage 20 has moved the pen 18 past the brush ring 24. As an alternate approach which will assure maximum cleaning of the pen tips 30, each newly-picked up pen 18 can be moved from the hub 12 to a position with the tip 30 located within the bristles 26 of the brush ring 24. At that point, motion of the pen carriage 20 can be stopped while the hub 12 and brush ring 24 are first rotated in one direction and then the other so as to wipe the pen tip 20 from opposite directions with the bristles 26. The pen lowering mechanism (not shown) of the pen carriage 20 could also be employed to lower the pen tip 30 into contact with a brush ring 24 carried at a lower level if desired or required by the structure of the particular plotter into which the present invention is incorporated.

Wherefore, having thus described the present invention, what is claimed is:

1. In a pen plotter having a pen carriage carrying a pen with a downward-facing plotting tip and wherein said pen carriage is moved by a pen carriage drive means which is controlled by a control logic means, thereby causing the movement of said pen carriage over a limited area including a plotting area, the improvement for automatically cleaning the tip at least one of (i) prior to and (ii) just after use, comprising:

a) a brush member having upward-facing bristles located at a portion of the plotter outside of the plotting area reachable by the pen carriage; and b) first additional control logic means contained in said control logic means for moving the pen carriage to said brush member to place the plotting tip within said bristles at least one of (i) prior to and (ii) just after plotting with the plotting tip.

2. The improvement for automatically cleaning the tip of the pen of a pen plotter of claim 1 and additionally comprising:

a) drive means for moving said brush member relative to the pen tip to have said bristles wipe the pen tip in a cleaning movement; and, b) second additional control logic means contained within said control logic means and connected to said drive means for causing said drive means to move said brush member relative to the pen tip when the plotting tip is within said bristles.

3. The improvement for automatically cleaning the tip of the pen of a pen plotter of claim 1 wherein:

a) the pen plotter includes a pen-holding and exchanging mechanism at a point outside of the plotting area; and, b) said brush member is located between said pen-holding and exchanging mechanism and the plotting area.

4. The improvement for automatically cleaning the tip of the pen of a pen plotter of claim 3 and additionally comprising:

a) drive means driven by said pen-holding and exchanging mechanism for moving said brush member relative to the pen tip to have said bristles wipe the pen tip in a cleaning movement; and, b) logic means contained within said control third additional control logic means and connected to said pen-holding and exchanging mechanism for causing said pen-holding and exchanging mechanism and thereby said drive means to move said brush member relative to the pen tip when the plotting tip is within said bristles.

5. The improvement for automatically cleaning the tip of the pen of a pen plotter of claim 4 wherein:

a) said pen-holding and exchanging mechanism is a turret having a rotating center hub; and, b) said brush member is a brush ring concentrically carried by said center hub.

6. The improvement for automatically cleaning the tip of the pen of a pen plotter of claim 5 and additionally comprising:

a ring-shaped debris tray disposed under said brush ring to catch debris falling from said brush ring.

7. The improvement for automatically cleaning the tip of the pen of a pen plotter of claim 5 wherein:

a) said first additional control logic means stops the pen carriage with the pen tip engaged in said bristles of said brush ring; and, b) said third additional control logic means rotates said center hub and said brush ring in combination to clean the pen tip.

8. The improvement for automatically cleaning the tip of the pen of a pen plotter of claim 7 wherein:

said third additional control logic means for rotating said center hub and said brush ring in combination to clean the pen tip first rotates said center hub and said brush ring in combination in a first direction and then rotates said center hub and said brush ring in combination in a direction opposite said first direction.

9. The improvement for automatically cleaning the tip of the pen of a pen plotter of claim 1 wherein:
said bristles are of a plastic material which is stiff enough to thoroughly clean debris from the pen tip without damage thereto but which will not wick ink from the pen tip.

10. In a pen plotter having a pen carriage carrying a pen with a downward-facing plotting tip and wherein said pen carriage is moved by a pen carriage drive means which is controlled by a control logic means, thereby causing the movement of said pen carriage over a limited area including a plotting area, the improvement for automatically cleaning the tip at least one of (i) prior to and (ii) just after use, comprising:
a) a brush member having upward-facing bristles located at a portion of the plotter outside of the plotting area reachable by the pen carriage;
b) drive means for moving said brush member relative to the pen tip to have said bristles wipe the pen tip in a cleaning movement; and
c) first additional control logic means contained in said control logic means and connected to said drive means for moving the pen carriage to said brush member to place the plotting tip within said bristles at least one of (i) prior to and (ii) just after plotting with the plotting tip and for causing said drive means to move said brush member relative to the pen tip when the plotting tip is within said bristles.

11. The improvement for automatically cleaning the tip of the pen of a pen plotter of claim 10 wherein:
a) the pen plotter includes a pen-holding and exchanging mechanism at a point outside of the plotting area; and,
b) said brush member is located between said pen-holding and exchanging mechanism and the plotting area.

12. The improvement for automatically cleaning the tip of the pen of a pen plotter of claim 11 and additionally comprising:
a) said drive means is driven by said pen-holding and exchanging mechanism; and,
b) said first additional control logic means connected to said pen-holding and exchanging mechanism for causing said pen-holding and exchanging mechanism and thereby said drive means to move said brush member relative to the pen tip when the plotting tip is within said bristles.

13. The improvement for automatically cleaning the tip of the pen of a pen plotter of claim 12 wherein:
a) said pen-holding and exchanging mechanism is a turret having a rotating center hub; and,
b) said brush member is a brush ring concentrically carried by said center hub.

14. The improvement for automatically cleaning the tip of the pen of a pen plotter of claim 13 and additionally comprising:
a ring-shaped debris tray disposed under said brush ring to catch debris falling from said brush ring.

15. The improvement for automatically cleaning the tip of the pen of a pen plotter of claim 13 wherein said first additional control logic means:

a) stops the pen carriage with the pen tip engaged in said bristles of said brush ring; and,
b) rotates said center hub and said brush ring in combination to clean the pen tip.

16. The improvement for automatically cleaning the tip of the pen of a pen plotter of claim 15 wherein:
said first additional control logic means for rotating said center hub and said brush ring in combination to clean the pen tip first rotates said center hub and said brush ring in combination in a first direction and then rotates said center hub and said brush ring in combination in a direction opposite said first direction.

17. The improvement for automatically cleaning the tip of the pen of a pen plotter of claim 10 wherein:
said bristles are of a plastic material which is stiff enough to thoroughly clean debris from the pen tip without damage thereto but which will not wick ink from the pen tip.

18. In a pen plotter having a pen carriage exchangeably carrying a pen with a downward-facing plotting tip and wherein said pen carriage is moved by a pen carriage drive means which is controlled by a control logic means, thereby causing the movement of said pen carriage over a limited area including a plotting area and also having a multiple pen-holding rotating turret hub wherein said rotating turret hub is rotated by a turret hub drive means controlled by the control logic means, cleaning apparatus for automatically cleaning the tip of the pen after pickup from the turret hub and at least one of (i) prior to and (ii) just after use, comprising:
a) a brush ring having upward-facing bristles concentrically carried by the turret hub; and,
b) first additional control logic means contained in said control logic means for moving the pen carriage to said brush ring to place the plotting tip within said bristles at least one of (i) prior to and (ii) just after plotting with the plotting tip and for rotating the turret hub and said brush ring in combination when the plotting tip is within said bristles whereby to clean the plotting tip with said bristles.

19. The cleaning apparatus for automatically cleaning the tip of the pen of a pen plotter of claim 18 wherein:
said first additional control logic means for rotating the turret hub and said brush ring in combination to clean the pen tip first rotates the turret hub and said brush ring in combination in a first direction and then rotates the turret hub and said brush ring in combination in a direction opposite said first direction.

20. The cleaning apparatus for automatically cleaning the tip of the pen of a pen plotter of claim 18 wherein:
said bristles are of a plastic material which is stiff enough to thoroughly clean debris from the pen tip without damage thereto but which will not wick ink from the pen tip, such as nylon and polyethylene.

21. The cleaning apparatus for automatically cleaning the tip of the pen of a pen plotter of claim 18 and additionally comprising:
a ring-shaped debris tray disposed under said brush ring to catch debris falling from said brush ring.

* * * * *